June 27, 1939. M. VIDAVER 2,163,816
TREATING APPARATUS
Filed Dec. 24, 1936 2 Sheets-Sheet 2
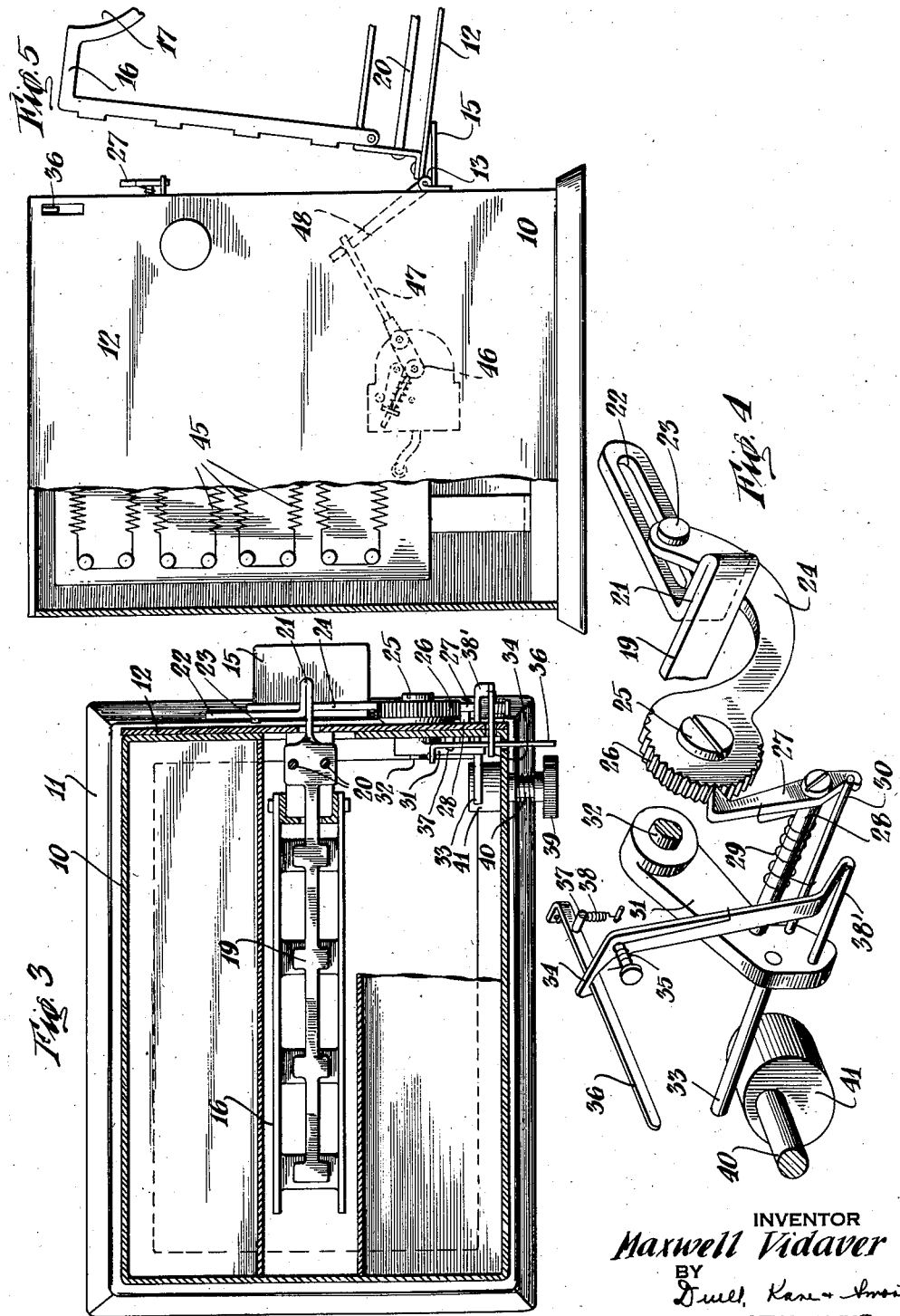
INVENTOR
Maxwell Vidaver
BY
ATTORNEYS Patented June 27, 1939

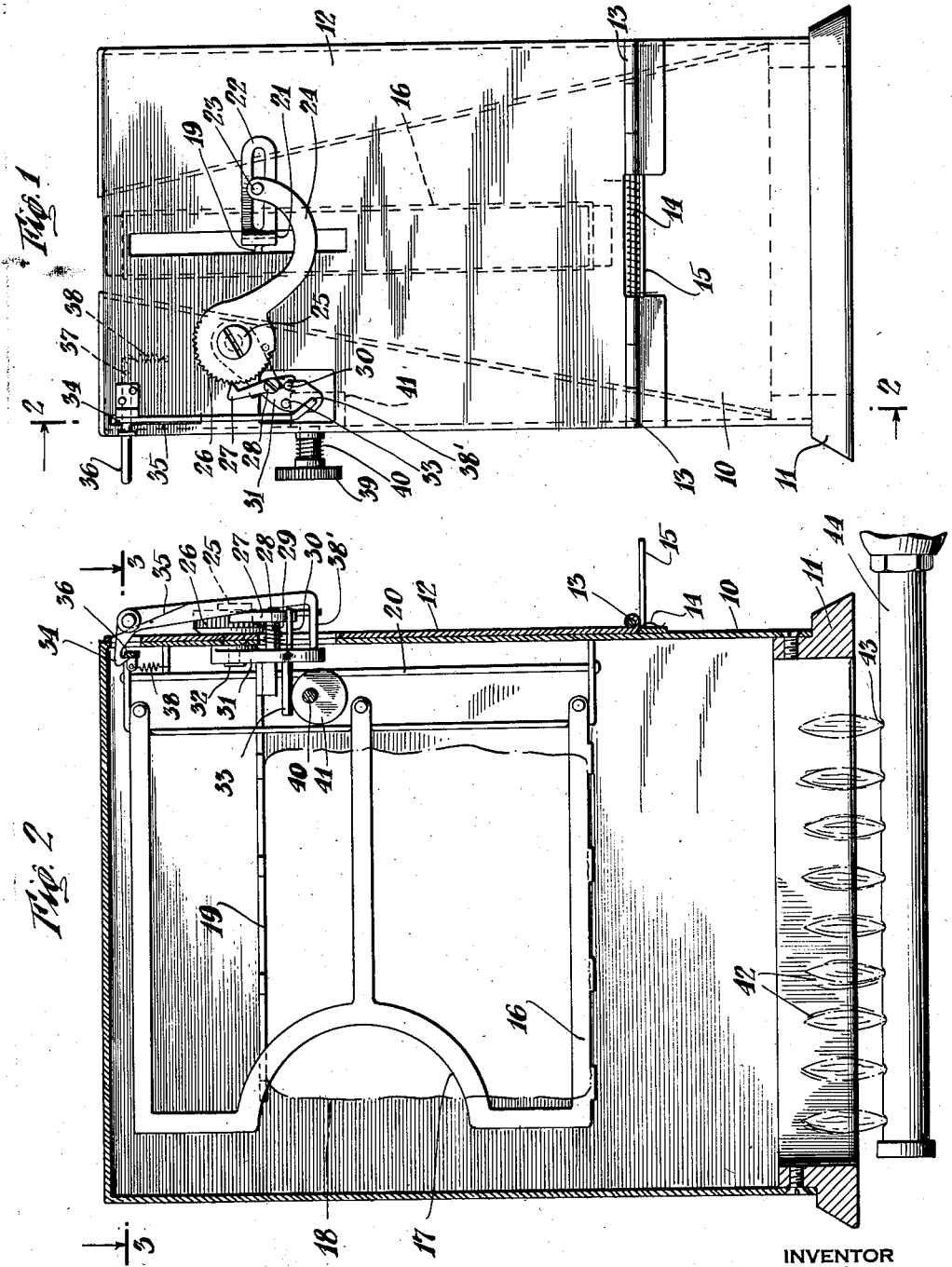

2,163,816

UNITED STATES PATENT OFFICE 2,163,816

TREATING APPARATUS

Maxwell Vidaver, New York, N. Y.

Application December 24, 1936, Serial No. 117,471

3 Claims. (Cl. 126—41)

This invention relates to a structurally and functionally improved cooking or heat-treating apparatus, and in its more specific aspects aims to provide a unit of this character which will be of primary utility in the conditioning and heating of foods.

It is an object of the invention to furnish an apparatus of this character and which may use any desired and practicable source of heat, and which apparatus, when the material being treated is brought to a proper condition, will automatically discontinue such treatment. Consequently, the apparatus will function automatically and be free from objections which have heretofore been levelled against similar apparatus and in which merely a time control has been employed for the purpose of terminating the treatment.

Considering one, and in certain respects the preferred, embodiment of the invention, it is a further object to furnish a toaster which will embody mechanism such that, after the slice of bread has been brought to a proper and desired condition, heat treatment thereof will be automatically discontinued. As a consequence, the operator—without having constantly to observe the functioning of the mechanism—will be able to place complete reliance upon the apparatus and know that each slice of bread or similar unit will be brought to a predetermined and proper condition before the apparatus discontinues treatment of the same. Thus, objections due to an article such as a slice of bread being under-done or charred, will be completely overcome.

An additional object is that of providing an apparatus by means of which the foregoing results may be achieved, and which apparatus will embody relatively few parts, each individually simple and rugged in construction, these parts operating over long periods of time with freedom from all difficulties.

With these and other objects in mind, reference is had to the attached sheets of drawings illustrating practical embodiments of the invention, and in which:

Fig. 1 is an end view of one form of apparatus;

Fig. 2 is a sectional side view thereof taken along the lines 2—2 and in the direction of the arrows as indicated in Fig. 1;

Fig. 3 is a sectional plan view taken along the lines 3—3 and in the direction of the arrows as indicated in Fig. 2;

Fig. 4 is an enlarged fragmentary perspective view of one form of mechanism which may cause proper operation of the unit; and Fig. 5 is a side elevation with certain of the parts broken away to disclose underlying construction, but showing an electrical heating unit in association therewith.

In these views, the numeral 10 indicates a casing which may be supported upon a suitable base 11 and which is provided with a front panel 12 connected to the main casing 10 by means of a hinge 13. A spring 14 may conventionally be associated with this hinge and tend normally to swing panel 12 outwardly to a position at which it extends substantially parallel to base 11. A ledge portion or portions 15 may be associated with the casing 10 and act as stops to limit the swinging movement of panel 12.

Secured to the inner face of panel 12 is a frame 16, which may be notched as at 17. This frame defines a space adequate to receive a slice of bread 18 or other unit to be heat treated, and extending within the frame is a contact bar or member 19 which is to engage the upper edge of the unit 18. It is, of course, to be understood that, as shown in Fig. 1, the upper face of the casing 10 is interrupted to an extent such that the frame 16 will be free to swing outwardly with the panel 12. The bar or member 19 is mounted for sliding movement upon rods 20, which form a part of frame 16, and the outer end of this member may be continued in the form of a handle portion 21, which extends through a slot in the panel 12. This handle portion—as best shown in Fig. 4—may have a slotted extension 22, within the slot of which a pin 23 rides. The pin is mounted upon an arm 24 having its inner end pivotally supported as at 25. Such inner end has its periphery formed with an annular series of teeth 26 similar to a ratchet portion, and a toothed dog 27 engages with these teeth. This dog is pivotally mounted upon a shaft 28, and a spring 29 tends normally to urge the same into contact with teeth 26. A rod 30 may, of course, be utilized as a stop member to limit the swinging movement of dog 27, should such a construction be desired.

A plate 31 is pivotally mounted as at 32 and preferably in line with the pivot of arm 24. This plate carries rod 30 as well as shaft 28, and may also carry a rod 33. Pivot 25 is supported by panel 12. Also supported by this panel is a latch lever 34, which may be spring-actuated as at 35 so as to normally tend to rotate in a clockwise direction as viewed in Fig. 4. Within casing 10 a bar 36 is pivotally supported as at 37, and a spring 38 tends normally to swing the outer end of this bar upwardly. This bar lies immediately to the rear of the front casing face, and its body may be extended through an opening in the side face of the casing, as is best shown in Fig. 3. Both the panel 12 and the front face of casing 10 are formed with an opening through which the latch portion of element 34 may extend. Consequently, with panel 12 in "closed" position, latch element 34 engages bar 36 to maintain such position. At this time it is also to be observed that element 34 is preferably provided with an extension 38', which bears in slidable contact with plate 31, in which condition the latch engages with bar 36.

Finally, it is to be noted that as especially shown in Figs. 1 and 3, a knob 39 may lie beyond the side wall of the casing and be secured to a shaft 40 which has rotatable bearing in such wall. The inner end of this shaft mounts an eccentric 41, which lies adjacent rod 33. It will accordingly be understood that by simply turning shaft 40, plate 31 will be swung around its pivotal support 32 so that extension 38 will lie either closer to, or more remote from the edge of plate 31. Consequently, if plate 31 is swinging at a more or less fixed rate of speed, a lesser period of time will be consumed for extension 38 to ride beyond the plate edge, if cam 41 is adjusted to its upper position, than would be the case if the parts are adjusted to the positions shown in Fig. 4.

In the form of apparatus shown in Figs. 1 to 3, gas or a similar source of heat is employed. To this end, base 11 may be formed with an opening through which flame jets 42 may act, these jets emanating from openings 43 in a fuel pipe 44. In the form of construction employed in Fig. 5, the casing 10 contains electrical resistance elements 45, which are controlled by a switch 46. The latter may in turn be controlled by being provided with an actuating rod 47, engaged by a yoke member 48, secured to panel 12, so that switch 46 will be open when the panel is in the position shown in Fig. 5, while this switch will be closed and the resistance elements 45 will be energized when the panel is swung to a position at which it extends parallel to the end wall of the casing.

Regardless, however, of the source of heat utilized, and recognizing that some form of automatic or semi-automatic cut-off might be employed in connection with the fluid fuel burner in Figs. 1 to 3, it will be appreciated that an operator proceeds as follows in utilizing the apparatus:

The outer end of bar 36 is depressed, so that the latch head clears this bar. Accordingly, panel 12 will swing outwardly and downwardly to the position shown in Fig. 5. By means of handle 21, bar 19 is elevated to a point at which an article 18 may readily be disposed within frame 16. Thereafter, handle 21 is moved towards the base of the unit and until bar 19 contacts the upper edge of the article 18. During such shifting of handle 21, it is obvious that arm 24 will be rocked, but this will have no operative result. With the parts in the position just described, the panel 12 is swung so that frame 16 lies within the casing as shown in Figs. 1 to 3. In other words, latch element 34 is brought to a position at which it snaps over the bar 36. Pivot 32 is mounted by the casing and preferably within the same. Consequently, as panel 12 is swung to its "closed" position, the extension 38' of latch element 34 will bear against the face of plate 31. Moreover, the dog 27 will be caused to engage between a pair of the teeth 26. Consequently, the panel will remain in the position to which it has been shifted.

It is to be remembered that bar 19, handle 21, and arm 24, are, under the influence of gravity, tending to shift downwardly. The only reason that they cannot effect such a shift is because the article 18 is supporting the bar 19 against movement. However, under the action of heat from either the resistance elements 45 or jets 42, the article will be treated, and will—as it approaches a proper condition—begin to shrink. Incident to such shrinkage, handle 21 will be permitted to move towards the base of frame 16. Consequently, the tooth portion 26 of arm 24 will swing around pivot 25. Thus, plate 31 will swing around pivot 32 and, upon a sufficient degree of movement having occurred, extension 38' will clear plate 31 and latch element 34 will accordingly shift out of engagement with bar 36 to allow the panel 12, under the influence of spring 14 or otherwise, to swing outwardly.

In the case of electrical resistances being employed, such outward movement may result in a disconnection of the heating elements from the source of electrical current supply. In the case of fluid fuel, any suitable and functionally similar expedient may be employed. However, in either instance, should the operator desire to vary the degree of treatment, this may readily be achieved simply by turning knob 39 to shift cam 41 and accordingly plate 31, so that a lesser or greater degree of relative travel between this plate and extension 38 follows.

Also, as indicated in dotted lines in Fig. 1, it will be apparent that deflecting plates or baffles may be employed, with a view to concentrating the heat, so that only a minimum amount of time will be consumed in toasting or treating the article.

It is obvious that numerous changes in construction and rearrangement of the parts might be resorted to without departing from the spirit of the invention as defined by the claims, which are:

1. A toaster including a source of heat, a container disposed adjacent said source and to receive an article to be treated, means contactible with said article to define one dimension of the same, means tending normally to shift said container out of operative association with such heat source, a latch for normally preventing such shifting, and means responsive to a predetermined degree of movement on the part of said defining means for releasing said latch.

2. A toaster including a source of heat, a container disposed adjacent said source and to receive an article to be treated, means contactible with said article to define one dimension of the same, means tending normally to shift said container out of operative association with such heat source, a latch for normally preventing such shifting, means responsive to a predetermined degree of movement on the part of said defining means for releasing said latch, and means for varying the degree of such movement.

3. A toaster including a source of heat, a container disposed adjacent said source and to receive an article to be treated, means contactible with said article to define one dimension of the same, means tending normally to shift said container out of operative association with such heat source, a latch for normally preventing such shifting, means responsive to a predetermined degree of movement on the part of said defining means for releasing said latch, and independent manually operable means for also releasing said latch.

MAXWELL VIDAVER.